Patented Dec. 6, 1949

2,490,049

UNITED STATES PATENT OFFICE 2,490,049

PROCESS OF MANUFACTURING CHINAWARE

Herbert H. Greger, Washington, D. C.

No Drawing. Application July 8, 1946, Serial No. 682,141

10 Claims. (Cl. 25—156)

This invention relates to the manufacture of chinaware. More particularly, it relates to a method of manufacturing chinaware in which novel advantages are obtained by the use of a water soluble, colloidal aluminum phosphate as an ingredient in the chinaware body.

The chinaware industry has relied during its long existence mainly on the properties of clays for bonding the ingredients together, for imparting plasticity suitable for shaping, molding or forming and for contributing alumina and silica to the composition of the ware. The addition of certain types of aluminum phosphates has important further advantages.

By the addition of these phosphates certain properties of the clay are enhanced and certain new and desirable properties are added. Among these properties are, for example, a considerable improvement in the adhesiveness or bonding quality of clay. Also, the aluminum phosphate makes the clay essentially non-slaking in water after dehydration of the phosphate by drying or baking at moderate temperature. Such new and desirable properties are the basis of the process of manufacturing chinaware hereinafter described.

The chinaware industry originated as a craft which was developed during centuries by many generations of craftsmen. The individual efforts of these craftsmen resulted in some cases in large scale operations. These men had to purify and process their raw materials in a long series of steps which finally led to the production of the ware. Many variations in appearance, translucency, decoration, strength and other characteristics of the ware were developed by these craftsmen, many of which, such as translucency, certain colors and the like, are highly valued today.

The industry of today has largely retained the complicated procedure of the old craft, although the individual processing steps may be carried out in modern equipment. A factory where, for instance, the regular line of dinnerware is produced, may be operated along the old well-established lines involving a vast number of individual steps of handling the raw materials by hand or by machinery through the stages of purification, blending, forming, decorating, glazing and firing. The majority of these steps are preliminary to firing but in many plants instead of firing only once the ware is fired twice, which is a heavy burden on kiln space and the economy of the manufacturing operation as well.

Some of the difficulties in the chinaware industry relative to simplification and an overall mechanization can be traced to processing limitations which are largely imposed by the properties of clays. It is, therefore, of importance, that such properties be modified. To provide suitable modifications of the properties of clays for simplification of manufacturing procedures is one of the principal objects of this invention.

A further object of this invention is to provide for the addition of colloidal aluminum phosphate solutions to the conventional ceramic body ingredients for modification of their properties.

A still further object of the invention is to provide a process for the improvement of adhesiveness and plasticity of clays by the addition of colloidal aluminum phosphate, thus modifying the chinaware body by reducing the conventionally needed amount of clay and permitting an increase in the content of feldspar, flint and other ingredients in the nature of fillers.

Another object is to provide a process for the production of chinaware of improved translucency by the reduction in clay content of the chinaware.

Yet another object is to provide for the elimination of the two-fire process by substitution for the bisque fire of a drying and baking step rendered possible by the employment of aluminum phosphate to impart considerable strength to the green ware while at the same time rendering it non-slaking in water.

With these and other objects in view the invention resides in a process for improving the manufacture of chinaware of various types, such as dinner or table ware for the serving of foods, art ware for decorative purposes, utility and industrial china used in homes, industrial or other establishments or in electrical appliances, or the like.

Typically, the invention includes improvements in the manufacture of chinaware which comprise shaping a plastic mixture comprising filler in amounts less than about 90%, clay in excess of about 10% and from about 5% to about 40%, preferably about 15% to about 30%, on the dry clay basis of a water soluble colloidal aluminum phosphate ranging in composition from mono- to di-aluminum phosphate, and baking the shaped article at a temperature of from 100° C. to 500° C. to form an article suitable for glazing and firing. The process of the invention may also include the subsequent steps of applying a glazing composition to the baked article and thereafter firing the article.

Aluminum phosphates have been used in the past in various ceramic industries in the form of tri-aluminum phosphate or aluminum metaphosphate. In some instances, the phosphate radical has been introduced into ceramic mixtures as phosphoric acid. The former two compounds have no binding quality at all and merely serve as a medium for introducing the phosphate radical into the ceramic body upon firing. Phosphoric acid will not serve the purpose of this invention because it is so highly acidic and reactive as to cause unpredictable reactions when used in wet ceramic compositions, resulting in changes in plasticity and workability of the compositions, heating of the mass, and requiring special care in handling for the protection of worker and equipment.

Applicant's copending applications Serial No. 490,495, filed June 11, 1943, now abandoned for Solid aluminum phosphates; Serial No. 494,526, filed July 13, 1943, which has become Patent 2,405,884 for Method of preparing aluminum phosphates; and Serial No. 494,527, filed July 13, 1943, now abandoned for Preparation of aluminum phosphates, describe the water soluble, colloidal aluminum phosphates which are employed in the process of this invention. These compounds may vary considerably in their alumina to phosphorus pentoxide ratio, but ratios between one and two mols of $Al_2O_3$ to three mols of $P_2O_5$ have been found to be most useful. These rations correspond to the mono-aluminum phosphate $Al(H_2PO_4)_3$ and the di-aluminum phosphate $Al_2(HPO_4)_3$, respectively. They are highly hydrated and form tacky, adhesive solutions in water and when dried at moderate temperatures of 100° C. or below form amorphous, glass-like solids which retain a large proportion of water of hydration. For example, a composition of 1½ to 1¾ mols of alumina to 3 mols of $P_2O_5$ contains about one-third of water. When heated to somewhat higher temperatures between 100° C. and about 500° C. the aluminum phosphate loses most of its water of hydration and its chemically combined water and becomes essentially insoluble. This process of insolubilizing is promoted by the presence of other compounds such as clays which enter into some chemical interaction with the phosphate. The clay particles which are enveloped by a shell of aluminum phosphate become non-slaking in water by this heat treatment. At the same time the clay-phosphate bond develops considerable strength. A chinaware body, if properly compounded with aluminum phosphate, may obtain a cross breaking strength of between about 600 to 1200 pounds per square inch and then has sufficient strength to resist handling in the stages of decorating and glaze application.

Ware that is shaped, dried and baked can then be decorated and the glaze applied by conventional methods without fear of sliming from slaking of the clay. The body of the ware is highly porous and will absorb moisture rather vigorously, for which condition adjustments can readily be made in the consistency of the glaze slurry.

In the practice of this invention, I prefer to use aqueous solutions of the water soluble colloidal aluminum phosphates described in the aforementioned copending applications as distinguished from the solid hydrates, this for simplicity and ease of incorporation in the plastic ceramic mix. It will be understood, however, that pulverulent solid aluminum phosphates may sometimes advantageously be incorporated in the mix instead.

The aluminum phosphate solutions are acidic, but non-injurious to the skin and non-toxic. Above a pH of 2.5 hydrolysis occurs with precipitation of the phosphate. These compounds are, therefore, incompatible with basic substances, such as carbonates of the alkali and alkaline earth metals and the like. These and other similar metals, if desired in the mix, preferably should be introduced into the ceramic mix in the form of compounds which are non-reactive with the aluminum phosphate in its wet state. Compounds for this purpose include, for instance, the various feldspars, sodium, potassium, calcium and lithium spars, the acid phosphates of these metals, magnesium silicates like talc, or artificial frits which may also contain heavy metals for coloring the body of the ware. Coloring compounds may be introduced in the form of oxides, if these are slowly reactive or non-reactive with the phosphate solution, such as chrome oxide, or, where the amount needed is only small, for instance in the case of cobalt oxide. If the acidic character of the aluminum phosphate solution is kept in mind, it will not be difficult to choose the proper materials.

Among water soluble salts which are compatible with the aluminum phosphate are nitrates, chlorides, oxalates and other salts of strong mineral and organic acids. These salts have the property of suppressing hydrolysis, but may be corrosive to metal equipment in large quantity. If necessary, metallic constituents in the form of their salts may be introduced in minor quantity.

Aluminum hydrogen phosphates are flocculating agents for clays. The wet body which is produced by the addition of these substances is, therefore, of a different kind than a body containing an alkaline reagent in which the clay is in deflocculated form. The flocculated clay usually permits faster drying, because it retains a more open structure. It should be kept in mind, however, that excessive flocculation of the clay and the formation of large aggregates of clay particles should be avoided, as this would adversely affect the quality of the ware and may cause a reduction in strength.

Excessive aggregation of clay particles can be largely avoided by taking certain precautions. Preferably, the clay is first thoroughly dispersed in water and the other constituents added in a suitable mixer before the aluminum phosphate is added. The finely divided constituents such as feldspar and flint then act as parting compounds for the clay and prevent or hinder excessive aggregation. Furthermore, the amount of water should be kept at the absolute minimum and the stiffest mud should be formed which is consistent with the subsequent forming method. This will permit a thorough dispersion of the clay by mechanical mixing or pugging, reduce the quantity of water which has to be evaporated later, reduce shrinkage and avoid distortion of the ware after forming due to softness.

In a stiff mud the clay particles have little chance for aggregation and, being enveloped by a film of aluminum phosphate, assume a highly adhesive condition. When this coating dries, it solidly cements the adjoining particles together, irrespective of whether they are clay or inert filler.

Some clays contain a certain amount of readily available base, especially ball clays or clays containing Montmorillonite. Reactions of the available base with the phosphate, if they occur in the drying or baking stage, may be desirable, as they promote the setting of the phosphate. Such reactions may also be induced, if desired, by the addition to the wet body of a suitable quantity of a reactive substance, for instance, aluminum hydrate, tri-aluminum phosphate, calcium and magnesium or zinc silicate, and the like. Such chemical promotion of the set will cause a reduction in the temperature or time of setting which may be found desirable in some instances.

The process as it is actually carried out in practice varies considerably with conditions and depends on many factors such as the choice of the clay, the type of aluminum phosphate and other ingredients, the forming methods, the type of end product desired, and the like. Those skilled in the art of making chinaware will have no difficulty in adapting the present disclosure to particular needs. It will be recognized as important, for instance, to adjust the amount of aluminum phosphate to the quantity and type of clay as well as to the fineness of division of the other ingredients.

Suitable types of clay include the plastic kaolins, the relatively non-plastic kaolins, and ball clay. Mixtures of clays may also be used, such as mixtures of kaolin and ball clay in which the ball clay may be present in amounts varying from 25% to 50%. The ceramic mixture may contain, for instance, 20% of such a clay mixture, 35% of feldspar and 45% flint. To this mixture is added, preferably in aqueous solution, about 3 to 5 per cent of water soluble colloidal aluminum phosphate (dry basis). The water content may vary from 3 to 12 per cent, depending on the desired consistency for producing either a dry pressing or a stiff mud body. In all cases it is preferable to use the minimum amount of both water and aluminum phosphate that will produce the desired result. An excess of these materials is likely to cause stickiness and difficulties in molding.

The water content of the aluminum phosphate solution should also be adjusted to produce the desired consistency of the ceramic mixture. For most purposes an $Al_2O_3$ to $P_2O_5$ ratio between 1¼ and 1½ to 3, or approximately the composition of sesqui-aluminum phosphate $AlH_3(PO_4)_2$, is recommended; 1⅜ to 3 being a very suitable ratio. The water content of the aluminum phosphate solution may be adjusted by preparing the solution from phosphoric acids of various strengths, such as 60, 75 and 85 per cent phosphoric acids which are commercially available grades. In preparing the phosphate solutions, aluminum hydrate may be dissolved in these acids, preferably by heating the acid to about 150° F. and introducing the hydrate at a slow rate while agitating thoroughly. The temperature will rise to the boiling point and the rate of introduction of the aluminum hydrate will govern the surge which develops.

Crystallization difficulties can be avoided by preparing the aluminum phosphate in a solid, water soluble form, as described in the aforementioned applications. This solid product may be mixed as a powder with the ceramic ingredients and dissolved by the addition of water. Or, aqueous solutions of the powder may be prepared for addition to the ceramic mixture.

One example of the manipulative steps of the invention is set forth by way of illustration as follows:

The clay is first plasticized in a mill with the desired amount of water, allowance being made for the water to be added in the solution of aluminum phosphate. Thereafter, the powdered flint and feldspar are added and, when these are thoroughly distributed, the aluminum phosphate solution is added to the mixture, the mixing being continued until substantial uniformity is obtained. For dry pressing, if the correct small quantity of water and aluminum phosphate solution of proper strength is used, the mass becomes granulated in the mixer and may subsequently be screened for more complete uniformity of grain size, if necessary. The mass is then molded in a rubber or plastic coated steel mold or the like at a pressure that will produce a slight flow. The shaped piece is discharged from the mold, placed on a conveyor belt to be dried and baked, for example, at about 300° C. in a tunnel oven. After cooling it is decorated, the glaze is applied and flash-dried and the green ware is then ready for firing.

In general, in the process of the invention chinaware is made from a plastic ceramic mixture including fillers such as flint, feldspar and frit or mixtures thereof in amounts less than 90% and preferably about 50% to 80% of the mixture, clay such as kaolin or ball clay in amounts in excess of about 10% and preferably about 20%, although very much higher quantities of clay may be used in some instances, and water soluble colloidal aluminum phosphate binder in amounts ranging from 1% to 25%, preferably 2% to 10% on the basis of dry mixture or from 5% to 40%, preferably from 15% to 30%, on the dry basis of the clay content of the mixture, plus water in the range of 3% to 12% of the mixture on the dry basis, the water being present in sufficient quantity to give the desired plasticity to the mixture.

The methods of the invention may advantageously be applied to the manufacture of ceramic wares which because of their shape are primarily formed in a plurality of sections, such as cups and other handled wares. The separately formed sections, such as the cup bowl and the cup handle, shaped and baked in accordance with the invention, are joined with the use of the aluminum phosphate modified plastic mixtures of the invention as adhesives. Advantageously, the mixtures to be used as adhesives are made somewhat more fluid, for example, by increasing the water content or by increasing the amount of water-soluble colloidal aluminum phosphate in the composition. Preferably, the joining of the sections is effected after any desired decorative compositions have been applied to the baked sections, and the glazing composition is applied to the joined article before firing.

The baked articles of the invention have sufficient strength for many uses without any firing treatment. They may be coated or decorated, for example, with paint or lacquer compositions, to provide inexpensive articles of substantial ruggedness for decorative purposes or other uses.

From the foregoing description it will be seen that the present invention provides an improved process for the manufacture of chinaware whereby the usual bisque fire may be eliminated with attendant advantages, the ware after shaping may be dried and baked at a relatively low temperature to produce green ware characterized by high strength and resistance to slaking during decorating and glazing, and the final fired product is of high quality and excellent strength. The process of the invention also makes it possible to incorporate relatively large amounts of fillers in the ceramic mixture to obtain ware of high translucency without sacrificing strength.

It will be understood that the foregoing description and examples are merely illustrative of the principles of the invention as defined in the claims.

I claim:

1. The method of making chinaware which comprises shaping a plastic mixture comprising filler and clay, the latter being present in excess of about 10% on the filler-clay basis and from about 15% to about 30% on the dry clay basis of a water soluble colloidal aluminum phosphate ranging in composition from mono- to di-aluminum phosphate, baking the shaped article at a temperature of from 100° C. to 500° C., applying a glazing composition to the baked article, and thereafter firing the article.

2. The method of making chinaware which comprises shaping a plastic mixture comprising filler and clay, the latter being present in excess of about 10% on the filler-clay basis and from about 15% to about 30% on the dry clay basis of a water soluble colloidal aluminum phosphate ranging in composition from mono- to di-aluminum phosphate, baking the shaped article at a temperature of about 300° C., applying a glazing composition to the baked article, and thereafter firing the article.

3. The method of making chinaware which comprises shaping a plastic mixture comprising filler and clay, the latter being present in excess of about 10% on the filler-clay basis and from about 15% to about 30% on the dry clay basis of a water soluble colloidal aluminum phosphate having an aluminum and phosphate content approximating that of sesqui-aluminum phosphate, baking the shaped article at a temperature of from 250° C. to 350° C., applying a glazing composition to the baked article, and thereafter firing the article.

4. In a method of making chinaware, the improvement which comprises shaping a plastic mixture comprising filler and clay, the latter being present in excess of about 10% and the filler-clay basis and from about 15% to about 30% on the dry clay basis of a water soluble colloidal aluminum phosphate ranging in composition from mono- to di-aluminum phosphate, and baking the shaped article at a temperature of from 100° C. to 500° C. to form an article suitable for glazing and firing.

5. In a method of making chinaware, the improvement which comprises shaping a plastic mixture comprising filler and clay, the latter being present in excess of about 10% on the filler-clay basis and from about 15% to about 30% on the dry clay basis of a water soluble colloidal aluminum phosphate having an aluminum and phosphate content approximating that of sesqui-aluminum phosphate, and baking the shaped article at a temperature of from 250° C. to 350° C. to form an article suitable for glazing and firing.

6. The method of making chinaware which comprises shaping a plastic mixture comprising on the dry basis about 35% feldspar, about 35% to 43% flint, and about 20% clay and about 10% to 2% of a water soluble aluminum phosphate having an aluminum and phosphate content approximating that of sesqui-aluminum phosphate plus sufficient water to render the mixture plastic, baking the shaped article at a temperature of from 250° C. to 350° C., applying a glazing composition to the baked article, and thereafter firing the article.

7. The method of making chinaware which comprises shaping a plastic mixture comprising filler, clay and a water soluble colloidal aluminum phosphate ranging in composition from mono- to di-aluminum phosphate, baking the shaped article at a temperature of from 100° C. to 500° C., applying a glazing composition to the baked article, and thereafter firing the article.

8. In a method of making chinaware, the improvement which comprises shaping a plastic mixture comprising filler and clay, the latter being present in excess of about 10% on the filler-clay basis and from about 5% to about 40% on the dry clay basis of a water soluble colloidal aluminum phosphate ranging in composition from mono- to di-aluminum phosphate, and baking the shaped article at a temperature of from 100° C. to 500° C. to form an article suitable for glazing and firing or for decoration and use as such.

9. In a method of making chinaware, the improvement which comprises shaping a plastic mixture comprising filler, clay and, on the dry basis of the mixture, from 1% to 25% of a water soluble aluminum phosphate ranging in composition from mono- to di-aluminum phosphate, and baking the shaped article at a temperature of from 100° C. to 500° C. to form an article suitable for glazing and firing or for decoration and use as such.

10. In a method of making chinaware, the improvement which comprises shaking a plastic ceramic mixture including clay in excess of about 10% and from about 15% to about 30% on the dry clay basis of a water soluble colloidal aluminum phosphate ranging in composition from mono- to di-aluminum phosphate and baking the shaped article at a temperature of from 100° C. to 500° C.

HERBERT H. GREGER.

REFERENCES CITED

The following references are of record in the file of this patent:

UNITED STATES PATENTS

| Number | Name | Date |
|---|---|---|
| 1,653,123 | Rentschler | Dec. 20, 1927 |
| 2,218,058 | Stalhane | Oct. 15, 1940 |

FOREIGN PATENTS

| Number | Country | Date |
|---|---|---|
| 60,384 | Norway | 1939 |
| 127,605 | Austria | 1932 |
| 462,781 | Great Britain | 1937 |